Oct. 14, 1958   B. JACKNIN   2,855,937
FILTER TIP
Filed Jan. 12, 1955
FIG. I
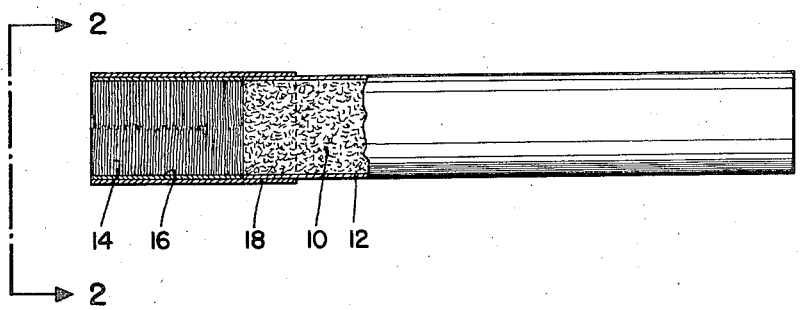
FIG. 2
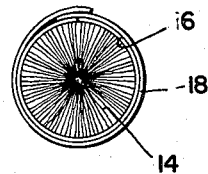
INVENTOR
BERNARD JACKNIN
BY
ATTORNEY United States Patent Office 2,855,937
Patented Oct. 14, 1958

2,855,937

FILTER TIP

Bernard Jacknin, Belleville, N. J., assignor to American Machine & Foundry Company, a corporation of New Jersey Application January 12, 1955, Serial No. 481,327

2 Claims. (Cl. 131—10)

This invention relates to filter tips and filter tip cigarettes.

Generally speaking, any filter tip can be made very efficient by increasing the density of the filtering medium. This, at the same time, increases the difficulty of drawing on the cigarette and, this detracts measurably from the pleasure of smoking and the acceptability of the product.

It is an object of this invention to provide a cigarette with an improved filter which will be attractive in appearance, efficient in filtering, and easy drawing.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 1 shows a cross-sectional side elevation of the improved filter tip cigarette.

Fig. 2 shows a cross-sectional end elevation of the improved filter tip taken on line 2—2 of Fig. 1.

The filter tip cigarette I have used to illustrate the invention may be manufactured in any suitable manner, such as by an "inserter" type cigarette making machine or by an "assembly" type machine.

In an "inserter" machine the filter plugs are inserted at spaced intervals at the time the cigarette rod is made while in the "assembly" type machine, the filters may be joined to cut lengths of cigarette filler by cork tips. The present invention is equally suitable for use with either method of manufacturing filter tip cigarettes.

The filtering fibers 14 in my filter plug are prearranged so that they extend perpendicularly with respect to the surface 16 of the filter plug. The fibers may be readily arranged in this manner by depositing fibers mechanically on the adhesive surface of a filter plug wrapper. When the adhesive sets the fibers will be held vertically with respect to the wrapper.

When the wrapper is rolled into a roll all of the fibers will project towards the core of the filter plug.

Another suitable means for arranging all of the fibers vertically would be by electrostatic means. For example, when depositing the fibers on an adhesive surface electrostatic means could be employed to line up all the fibers relative to the plug papers so that they extend transversely thereto.

When the paper tape 16 is rolled into a circular tube to form a filter plug, all of the perpendicular fibers will intermesh with each other and will be directed towards a common center as shown in Fig. 2 while the sides of the individual filtering fibers will be transverse to the direction to which smoke blows through the filtering plug as shown in Fig. 1.

It will thus be apparent that when cigarette smoke is drawn through the cigarette filter it strikes the individual filtering elements broadside, thus enabling each filter element to be much more effective in filtering out impurities than would be possible as in the case where cigarette smoke has to travel along the length of the individual filter fibers.

Because of the systematic arrangement of filtering fibers, it is possible to obtain more filtering action with a smaller number of fibers, thus enabling smoke to be easily drawn through the filtering element.

My invention may be readily employed with any suitable filtering fibers such as for example cotton or rayon.

The invention hereinabove described may be varied in construction within the scope of the claims, for the particular device selected to illustrate the invention is but one of many possible embodiments of the same. The invention, therefore is not to be restricted to the precise details of the structure shown and described.

What is claimed is:

1. An improved cigarette filter plug comprising a wrapper, filtering fibers deposited vertically and closely together on said wrapper, an adhesive for securing said filtering fibers so that they extend vertically from said wrapper, means securing said wrapper so as to form a cylindrical plug, said fibers having a length which is equal to the radius of said cylindrical plug so as to fill up the entire cross-sectional area of the filter plug, said fibers extending substantially the entire length of said plug and to the axis of said plug, and means for securing said cylindrical plug to the end of a cigarette.

2. A filter tip cigarette comprising a length of cigarette filler, and a filter plug joined to the end of said cigarette filler, said plug having the filter fibers therein arranged closely together in substantially parallel planes to each other and perpendicular to the side walls of the filter plug, and wherein the fibers are equal in length to the radius of the plug and extend to the axis of said plug so as to fill in the entire cross-sectional area thereof.

References Cited in the file of this patent

UNITED STATES PATENTS

| | | |
|---|---|---|
| 606,537 | Goldenfarb | June 28, 1898 |
| 636,088 | Voron | Oct. 31, 1899 |
| 1,950,542 | Copell | Mar. 13, 1934 |
| 1,967,585 | Minton | July 24, 1934 |
| 2,126,422 | Tarrant | Aug. 9, 1938 |
| 2,150,512 | May | Mar. 14, 1939 |
| 2,227,358 | Martin | Dec. 3, 1940 |

FOREIGN PATENTS

| | | |
|---|---|---|
| 672,057 | France | Dec. 23, 1929 |